No. 828,483. PATENTED AUG. 14, 1906.
W. KEENAN.
GLASS MOLD.
APPLICATION FILED MAR. 24, 1905.
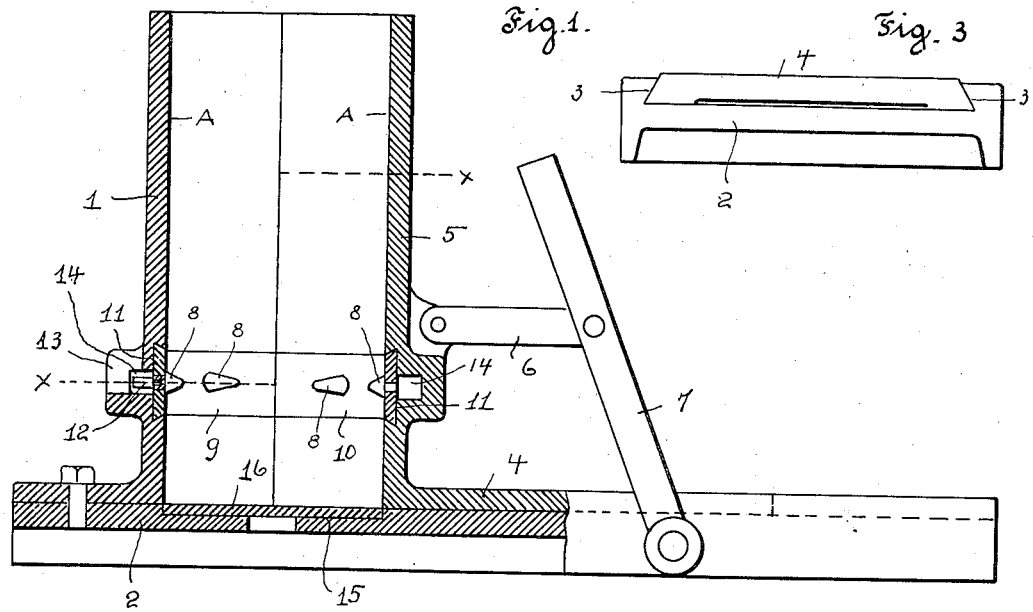
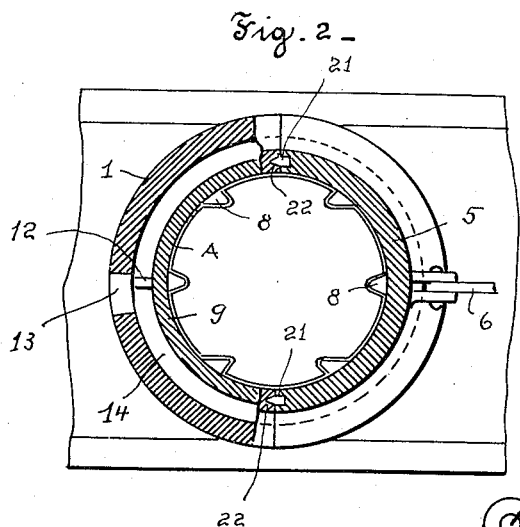
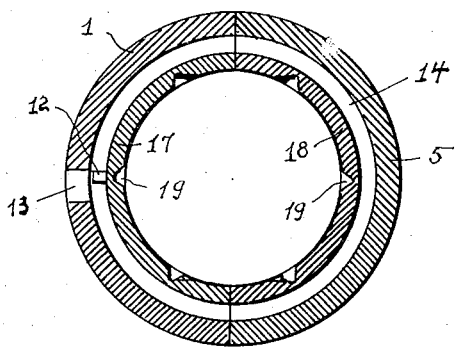
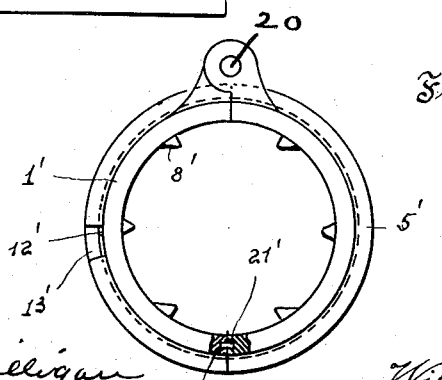
Witnesses
Bernard C. Gilligan
Peter J. Muller
Inventor
William Keenan
By Herman H. Martin
Attorney

UNITED STATES PATENT OFFICE.

WILLIAM KEENAN, OF TOLEDO, OHIO, ASSIGNOR OF ONE-THIRD TO BERNARD C. GILLIGAN, OF TOLEDO, OHIO.

GLASS-MOLD.

No. 828,483.  Specification of Letters Patent.  Patented Aug. 14, 1906.

Application filed March 24, 1905. Serial No. 251,775.

*To all whom it may concern:*

Be it known that I, WILLIAM KEENAN, a citizen of the United States, residing at Toledo, in the county of Lucas and State of Ohio, have invented a new and useful Improvement in Glass-Molds, of which the following is a specification.

My invention relates to a mold for blown glassware, and has for its object to provide a mold of the kind by means of which glassware may be blown without mold-seams; and a further object is to adapt the mold for forming protuberances on the face or into the interior of the blown glassware.

The objects of my invention are accomplished as hereinafter described, and illustrated in the drawings, in which—

Figure 1 is a vertical section, partly in elevation, of a mold constructed in accordance with my invention. Fig. 2 is a plan section on line X X of Fig. 1, showing the mold filled and in position to be opened. Fig. 3 is an end elevation of the moldway. Fig. 4 is a section like Fig. 2, but showing a modification in that the protuberances are formed on the face of the glassware; and Fig. 5 is a top plan view of mold in which the sections are hinged together.

In Figs. 1 to 4, inclusive, the mold-section 1 is fixed to a bed-plate 2, which is formed with ways 3 to movably receive thereon the base 4 of the opposite mold-section 5. A link 6, coupled to this mold-section and to a lever 7, pivoted to the bed-plate, furnish means to move the mold-section 5 against or away from the mold-section 1. The inner walls of the sections 1 and 5 are shaped as opposite semimold A of any desired form and size and are adapted when the sections are brought together to jointly form a complete mold, in which glassware is produced by blowing paste-glass suspended from a pipe against the wall of the mold. In order to form protuberance on the inner wall of the glassware, the mold is provided with a plurality of studs 8, each arranged in line with the separation of the mold-sections, and to permit twirling of the glassware to avoid mold-joint seams the studs 8 are mounted to ring-sections 9 and 10, which are revolubly let in and held in a dovetailed annular recess 11, formed continuous through both sections. The ring-section 9 is provided with a stud 12, arranged to indicate through a slot 13 in the mold-section 1 when the parting-line of the ring-sections 9 and 10 is coincident with the parting-line of the mold, in which coincident position only the parting of the mold-sections is possible. A portion 14 of the recess 11 is extended in line with the indicator-stud to form a free path for the same when the ring-sections are revolved. The bed-plate 2 is also provided with a circular recess 15, into which a plate 16 is inserted to form a revoluble mold-bottom, facilitating twirling of the glassware to avoid the mold-joints appearing therein.

In Fig. 4 the mold-sections 1 and 5 are provided with ring-sections 17 and 18, each of which is provided with a plurality of recesses 19, adapted to form protuberances on the face of the glassware, said recesses being also arranged to permit the glassware, with the protuberances, to be freely withdrawn when the mold-sections are separated the required distance.

In Fig. 5 the mold-sections 1' and 5' are provided with hinges 20, permitting them to swing open, and may be provided with either the ring-sections 9 and 10 or ring-sections 17 and 18.

One of the mold-sections is preferably provided with dovel-pins 21, adapted to enter coincident apertures 22, formed in the opposite section to assure alinement of the dovetail recess 11 when the sections are brought together for forming the mold.

In the manufacture of glassware having a perforated section these molds are particularly useful in that the protuberances may be easily removed after the ware has been released from the mold and producing thereby glassware having no visible seam other than in the perforated section.

What I claim is—

In a glass-mold comprising partible mold-sections, having an annular recess formed continuous through the sections, a ring revolubly mounted in the annular recess, partible with the mold-sections and having means for forming protuberances on the blown glassware and a revoluble bottom-plate for the mold.

In witness whereof I have hereunto signed my name, in the presence of two subscribing witnesses, this 22d day of March, 1905.

WILLIAM KEENAN.

Witnesses:
PETER J. METTLER,
EDWARD R. METTLER.